United States Patent Office 3,464,301
Patented Sept. 2, 1969

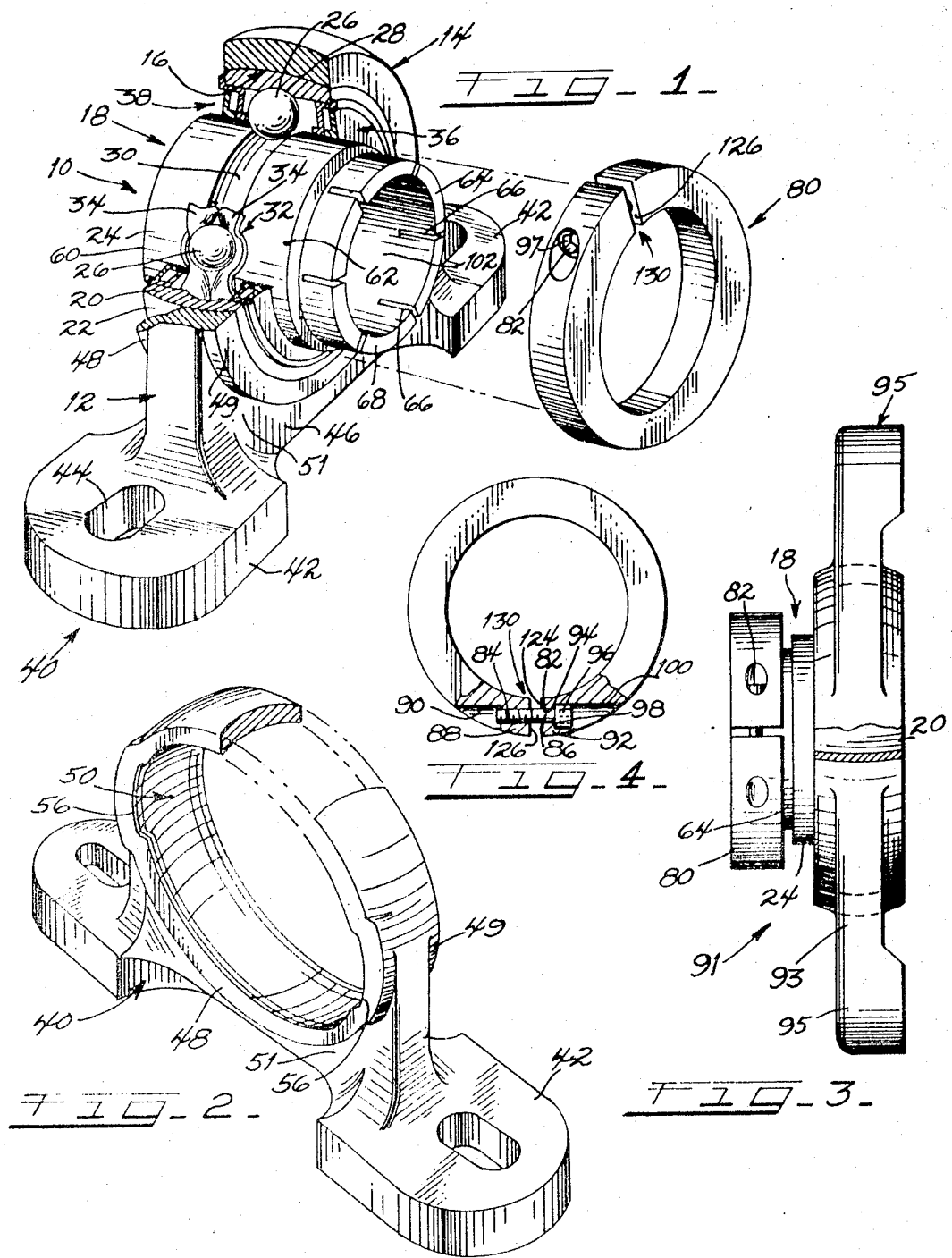

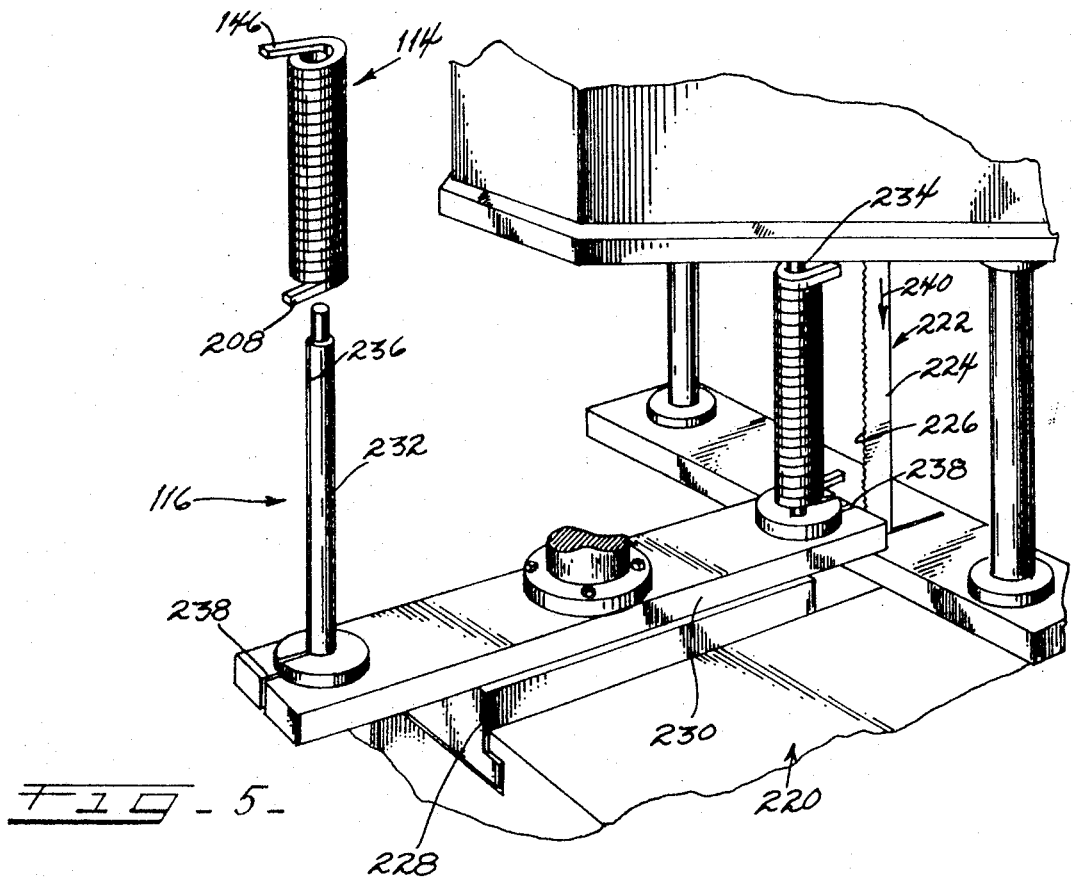
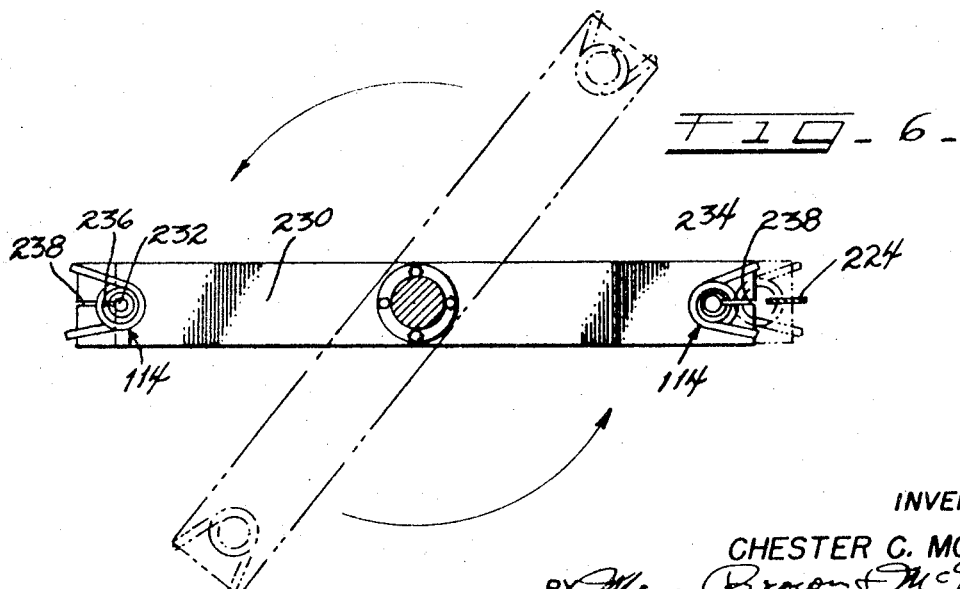
INVENTOR
CHESTER C. MOORE
BY
ATT'YS

---

3,464,301
APPARATUS FOR SPLITTING A BAR WOUND IN A HELIX
Chester C. Moore, Aurora, Ill., assignor to Stephens-Adamson Mfg. Co., a corporation of Illinois
Original application Sept. 22, 1965, Ser. No. 489,141, now Patent No. 3,373,472, dated Mar. 19, 1968. Divided and this application June 9, 1967, Ser. No. 661,152
Int. Cl. B26d 1/46
U.S. Cl. 83—201
2 Claims

ABSTRACT OF THE DISCLOSURE

The disclosure has to do with a method of making a ball bearing assembly and apparatus for use in making a locking collar therefor. The ball bearing assembly is concerned with using a special inner race member that receives a shaft or the like to be journalled and has at least one end of same formed with a plurality of spaced slots extending longitudinally thereof, assembling an outer race and bearing balls in abutting relation therewith, and applying a C-shaped clamping collar to the inner race slotted end portion and clamping the collar against the inner race to lock the inner race to the shaft or the like. The apparatus for use in making the locking collar involves processing a helix that has been formed by coiling a length of bar stock in which the helix is applied over a vertical arbor that is vertically slotted, and moving the arbor toward a band saw blade pass with the arbor slot aligned with the blade to cut the helix into segments.

---

This application is a division of my application Ser. No. 489,141, filed Sept. 22, 1965, now Patent No. 3,373,472, granted Mar. 19, 1968.

My invention relates to an apparatus for splitting a bar wound in a helix, and more particularly, an apparatus for splitting a bar wound in a helix as part of a method of making locking collars for ball bearing devices employing inner race rings and a locking collar for securing the inner race ring to a shaft.

Heretofore ball bearing units of the type shown in Richmond Patent 3,189,979, granted June 22, 1965, have been arranged to have their inner races secured to the shaft by set screws or by cam action devices, which not only have tended to cock the inner race somewhat of the shaft, but also frequently in a cocked position. This has been the source of an undue amount of vibration on the shaft and bearing, and has frequently resulted in fretting corrosion that causes the inner race to become frozen to the shaft; also, a marring and moving away of the shaft itself frequently results, which sometimes results in having to replace the shaft.

A principal object of the invention of said application is to provide a bearing assembly arrangement in which the inner race may be firmly secured to the shaft in perfect aixal alignment therewith.

A principal object of the invention is to provide, for a method of making locking collars for use in connection with ball baring assemblies, apparatus for splitting a bar wound in a helix to provide bar segments from which the locking collars are formed, that substantially reduces the cost of manufacture of the bearing and provides a product of uniformly high quality characteristics.

Other objects of the invention are to provide improved procedures in connection with the making of locking collars, and to provide a locking collar arrangement that is economical of manufacture, efficient and long lived in use and susceptible of a wide variety of applications.

Other objects, uses, and advantages will be obvious or become apparent from a consideration of the following detailed description and the application drawings.

In the drawings:
FIGURE 1 is a perspective view, partially in section, showing a completed ball bearing pillow block type unit of the type to which this invention relates, showing the locking collar of this unit displaced from its locking position on the bearing assembly inner race;
FIGURE 2 is a perspective view, partially in section, showing one form of pillow block housing that may be used in the fabrication of pillow block ball bearing units arranged in accordance with this invention;
FIGURE 3 is a side elevational view of a flange type ball bearing unit equipped with the ball bearing assembly of FIGURE 1;
FIGURE 4 is a plan view of the locking collar employed in connection with the ball bearing assembly of FIGURE 1 with parts being shown in section;
FIGURE 5 is a perspective view illustrating an arrangement for segmenting the intermediate product shown in FIGURE 6 of said application that is made by employing the bar coiling method and apparatus there disclosed, into separate elements or blanks that are to be individually fabricated into the locking collars; and
FIGURE 6 is a diagrammatic plan view of the principal components of the apparatus shown in FIGURE 5, illustrating the operation thereof.

However, it is to be distinctly understood that the specific drawing illustrations provided are supplied primarily to comply with the requirements of the patent code, and that the invention may have other specific embodiments which are intended to be covered by the appended claims.

General description of bearing unit

Referring now more specifically to FIGURES 1–4 of the drawings, reference numeral 10 generally indicates a pillow block ball bearing unit of the type that may be made by practicing my invention.

The bearing unit 10 generally comprises a pillow block type housing 12 provided with an annular housing portion 14 that in the form shown is provided with a spherically contoured bearing seat 16 in which is swivably mounted a ball bearing assembly 18 arranged in accordance with this invention.

The ball bearing assembly 18 comprises an outer race 20 provided with a spherically contoured external surface or periphery 22 that is complementary to and coacts with the housing portion bearing seat 16, an inner race 24, a plurality of bearing balls 26 mounted in the ball race grooves 28 and 30 of the respective races, a suitable type of ball retainer device 32, which in the form shown comprises a pair of rings 34 that are formed and riveted or clamped together in any conventional manner to space the balls 26 equidistantly from each other, and sealing ring assemblies 36 and 38 applied between the inner and outer races on either side of the ball bearing assembly to form a seal for the bearing unit.

The housing 12 further comprises a base 40 provided with a pair of feet or lugs 42 that are formed with suitable openings 44 for the reception of mounting screws or bolts or the like. The annular housing portion 14 of the pillow block housing 12 defines an opening 50, and is connected to the feet or lugs 42 by an upstanding vertical wall portion 46, and in the form shown, the annular housing portion 14 defines end portions 48 and 49 that project beyond the side surfaces 51 of the wall portion 46.

As indicated in FIGURE 2, the end portion 48 of the housing portion 14 is formed with loading slots 56 for receiving preassembled bearing assemblies 18.

The housing 12 as shown in FIGURE 2 may be made in accordance with the teachings of said Richmond patent (the disclosure of which is incorporated herein by this reference), and when so made, is adapted to receive ball bearing assemblies that are assembled in accordance with this invention.

Method of making bearing unit

The housing 12 is cast or formed from a suitable ductile or malleable material, such as ductile cast iron, nodular iron, malleable cast iron, perlitic malleable iron, Mechanite, bronze, aluminum bronze or the like.

The inner race 24 is formed from steel, with the zone of the inner race that defines the raceway 30 being hardened in any suitable manner, leaving the end portions 60 and 62 unhardened, and thus relatively soft as compared to the hardened raceway. The end portion 62 is formed with an annular flange portion or extension 64 of reduced external diameter that is formed with a plurality of slots 66 that extend longitudinally of the axis of the inner race and that are equally spaced about the circumference of the inner race. The slots 66 define resilient gripping fingers 68 that are employed to clamp the inner race 24 to a shaft over which the inner race is received in the normal operating position of bearing unit 10.

The bearing assembly 18 is assembled by taking the inner race 24 and placing it within the outer race 22 and applying a plurality of bearing balls 26 therebetween in any convenient manner. The retaining rings 34 are inserted from the sides of the assembly and are riveted or clamped together in any conventional manner to properly hold the balls 26 in their proper spaced relationship within the bearing grooves. The bearing assembly is then sealed by applying the seal assemblies 36 and 38 in any known manner.

The thus assembled bearing assembly is applied to the housing 12 by turning the assembly so that its plane extends perpendicular to the plane of the housing portion 14, and then inserting the outer race 22 into the loading slots 56 until the center of the outer race is substantially aligned with the center of the bearing seat 16. The bearing assembly 18 may then be rotated 90 degrees into substantial coplanar relation with the housing portion 14, and locking collar 80 arranged and made in accordance with this invention is applied over extension 64 to serve as a device to clamp the inner race to the shaft it cooperates with. Locking collar 80 includes a cap screw 82, that has a threaded portion 84 of its stem or body 86 screw threadedly received in an end portion 88 of the collar so that the collar can be contracted against the fingers 68 to clamp the inner race to a shaft.

The locking collar end portion 88 is recessed or enlarged as at 90, and the other end portion 92 of the locking collar is formed with a bore 94 through which cap screw 82 extends, with the head 96 of the cap screw seating against a shoulder 98 that is defined by a recess 100 formed in the end portion 92.

In use, the bearing unit 10 as shown in FIGURE 1 with the locking collar 80 slipped in place over the fingers 68 is applied to the shaft the bearing unit is to journal by slipping the shaft through the bore 102 of the inner race, and after the shaft and bearing unit have been appropriately positioned with respect to each other, a suitable turning tool is applied to the cap screw 82 to contact the collar 80 against the fingers 68 and draw the fingers 68 into tight clamping engagement with the shaft surface. Cap screw 82 has its head 96 formed with a suitably shaped polygonal indentation 97 adapted to cooperate with a complementarily shaped tool for this purpose.

The result is that the inner race is securely made fast to the shaft in exact axial alignment therewith and without marring or damaging the surface of the shaft in any way.

FIGURE 3 shows a flange type bearing unit 91 that includes flange type housing 93 having a bearing assembly 18 including a locking collar 80 applied thereto. Housing 93 differs from housing 12 primarily in that it is provided with lugs 95 adapted for flange type bearing applications. Unit 91 is otherwise the same as unit 10, as indicated by corresponding reference numerals, assembly 18 being applied through loading slots (not shown) that are the same as loading slots 56 of FIGURE 2. Unit 91 is thus assembled following the same steps described above.

The locking collar 80 is preferably made in the manner more fully described in my said application (the disclosure of which is incorporated herein by this reference), the disclosure of the instant application being directed to the apparatus for splitting a bar wound in a helix to provide elements from which the locking collar is made.

As disclosed in said application, a section of bar stock 110 of square section is applied to a coiling apparatus 112 of my said application that is shown in FIGURES 5–8 thereof to coil the bar stock 110 into a tight helix, an example of which is shown at 114 in FIGURE 6 of said application. The helix is removed from apparatus 112 and is split to form individual lock washer shaped collar blanks by employing the cutting apparatus 116 illustrated in FIGURES 5 and 6 of the instant application, after which the individual blanks are flattened by employing the die apparatus shown in FIGURE 12 of said application, and then the blanks are individually coined to the final locking collar external and internal diameters by employing the die apparatus 122 shown in FIGURES 15–17 of said application.

The individual locking collar blanks are then processed in the manner indicated in FIGURES 18–23 of said application to form the recesses and holes in the locking collar that receive the cap screw 82, and in the course of this processing, the end portions 88 and 92 of the locking collar are formed with oppositely disposed planar surfaces 124 and 126 (see FIGURE 4) that define the gap 130 between the end portions of the locking collar.

Helix cutting apparatus

The helix cutting apparatus 116 of FIGURES 5 and 6 is only diagrammatically illustrated, and comprises a bed 220 of a suitable apparatus which journals a band saw generally indicated at 222, one pass of which is shown at 224. Mounted for sliding movement toward and away from the cutting edge 226 of the band saw 222 is a carriage 228 that swingably mounts a beam 230 which carries at each of its ends an upright arbor 232 and 234, each of which is formed with a band saw blade receiving groove 236 that is placed in alignment with the band saw receiving notch 238 at the respective ends of beam 230.

Suitable means are provided for feeding the carriage 228 toward and away from the band saw blade pass 224 and this may comprise any known means suitable for shifting carriage 228 longitudinally therof, as will be apparent to those skilled in the art.

In use, a helix 114 is applied to an upright arbor 232 when the arbor is in the position at the left hand side of FIGURE 5, with the helix being disposed with respect to the groove 236 so that the terminal end portions 146 and 208 are disposed approximately equidistantly on either side of the groove 236. The beam 230 is then swung approximately 180 degrees to dispose the helix 114 at the right side of FIGURE 5 in appropriate cutting relation with the band saw blade pass 224, in which relation the helix should be positioned approximately as shown at the right hand side of FIGURE 6 in the full line position. The carriage 228 is then fed toward the band saw blade pass 224 and the band blade 222 is actuated in the direction indicated by the arrow 240, and the relative movement of the carriage 228 disposes the band saw blade pass 224 first in the slit 238 at the base of the adjacent arbor 234, and thence the band saw pass comes into sawing engagement with the helix 114 and severs the helix longitudinally thereof to form a plurality of separate lock washer shaped segments or elements of the type indicated at 118 in FIGURE 11 of said application. After the sawing action has been completed, the movement of carriage 228 is reversed and the beam again moved 180 degrees to position the saw helix at the left hand side of FIGURE 5, whereupon the sawed helix elements may be removed from the arbor on which they have been placed.

The two arbor arrangement of beam 230 permits a second helix 114 in the meantime to have been placed on the other arbor, and this helix is then run through the sawing operations as the helix segments are removed from the other arbor.

This arrangement permits all portions of the helix to be formed into locking collars except the end portions 146 and 208 which are discarded.

The individual helix segments or elements which are indicated at 118 in my said application, are then subjected to the method steps employed in the operation of the apparatus shown in FIGURES 11–23 of said application to complete the formation of the individual locking collar structures, except for the application of the cap screw.

It will therefore be seen that I have provided novel and effective ways of making or assembling ball bearing assemblies and units, as well as a novel effective and inexpensive method of making locking collars therefor.

The bearing assembly arrangements shown in FIGURES 1 and 3 not only affix the inner race of the bearing assembly to the shaft in substantially perfect axial alignment with the axis of the shaft, the inner race is firmly clamped against any possible movement by merely suitably positioning the cap screw 82 so that the inner race clamping fingers 68 are drawn against the shaft surface.

As I prefer to apply the ball bearing assemblies 18 to the housings 12 through the housing loading slots 56, the overall length of the inner race, when assembled to the outer race in the manner shown in FIGURE 1, must not extend at any point beyond the imaginary sphere that is defined by a projection of the contour of bearing seat 16 and outer race surface 22.

The bearing arrangements shown in FIGURES 1 and 3 of the drawings are also adapted for application to undersized or worn shafts and provided an appropriate gripping action even though the shaft tolerance difference may be in excess of two or three thousandths.

The units 10 and 91 represent only several of the specific type of housing units to which ball bearing assemblies 18 and their locking collars may be applied. Furthermore, in some applications it is not necessary that the assembly 18 be swively mounted, and in such cases the external surface of the outer race need not be spherically contoured.

It frequently happens that assemblies 18 and their locking collars 80 are sold separately from their housings, in which case the locking collars may be assembled on the respective assemblies 18 for facilitating shipping purposes.

Assemblies 18 may be applied to the housings of FIGURES 1 and 3 by following the methods of Claven et al. Patent 2,952,898 to provide an alternate method of making these assemblies.

The method of making the locking collar herein disclosed has been found to make it possible to produce locking collars at a fraction of the cost of making them by a straight screw machine operation. Furthermore, machining of the locking collar is held to a minimum and the dimensioning of the internal and external diameters can be achieved with a tolerance and smoothness not possible in employing a screw machine.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. Apparatus for splitting a bar wound in a tigh helix comprising
   an upright arbor member formed with a slot extending longitudinally thereof, over which the helix is placed,
   and band saw means including a band saw blade member,
   with one of said members being alignable with the other of said members to dispose said slot in the same plane as said blade,
   and means for moving one of said members toward the other of said members to bring said saw member against a helix received on said arbor.
2. The apparatus set forth in claim 1 wherein:
   said arbor is mounted at one end of a beam mounted for swinging movement intermediate its ends,
   and including a second arbor mounted at the other end of said beam,
   said second arbor being formed with a slot extending longitudinally thereof over which a helix may be placed,
   said second arbor being positioned to present its said slot to said saw member when the other arbor is moved away from said saw.

References Cited

UNITED STATES PATENTS

| 1,377,266 | 5/1921 | Mossberg. | |
| 1,602,509 | 10/1926 | Six | 83—907 X |
| 1,902,269 | 3/1933 | Stoll | 10—73 |

FOREIGN PATENTS

| 863,379 | 3/1941 | France. |

WILLIAM S. LAWSON, Primary Examiner

U.S. Cl. X.R.

10—73; 83—54, 267, 409, 907